US008489462B2

United States Patent
Diaz et al.

(10) Patent No.: US 8,489,462 B2
(45) Date of Patent: Jul. 16, 2013

(54) ADVANCED SALES SYSTEM

(75) Inventors: Daniel Diaz, Panama (PA); Carlos Hoffman, Panama (PA); Arthur Fuss, Studio City, CA (US); John E. Kourany, Panama (PA); Scott Zornig, Coto de Caza, CA (US)

(73) Assignee: Igoote Express Trading Co., Los Angelas, CA (US)

( * ) Notice: Subject to any disclaimer, the term of this patent is extended or adjusted under 35 U.S.C. 154(b) by 26 days.

(21) Appl. No.: 12/752,119

(22) Filed: Mar. 31, 2010

(65) Prior Publication Data
US 2010/0280867 A1 Nov. 4, 2010

Related U.S. Application Data

(60) Provisional application No. 61/164,992, filed on Mar. 31, 2009.

(51) Int. Cl.
*G06Q 30/00* (2012.01)
(52) U.S. Cl.
USPC .......................................... 705/26.1

(58) Field of Classification Search
USPC ........................................... 705/26.1
See application file for complete search history.

(56) References Cited

U.S. PATENT DOCUMENTS
2009/0125409 A1* 5/2009 Barton ............................ 705/26

* cited by examiner

*Primary Examiner* — Mila Airapetian
(74) *Attorney, Agent, or Firm* — Robert R. Waters; Brian W. Foxworthy; Waters Law Group, PLLC

(57) ABSTRACT

A first entity maintains an advanced sales system on a server accessible over a global communications network. The first entity provides access to the server to a second entity which is a sales oriented business. The server houses at least a database, a product selection module, and a proposal generator. The database contains information on products for sale, information about the sales oriented business, and information about customers of the sales oriented business. The product selection module facilitates selection and accessorizing of products by the second entity. The proposal generator creates proposals based on input to the product selection module and information in the database. The advanced sales system provides structure to extremely large product offerings with large numbers of accessories associated with the product offerings. Some embodiments of the advanced sales system provide additional ordering support.

7 Claims, 9 Drawing Sheets

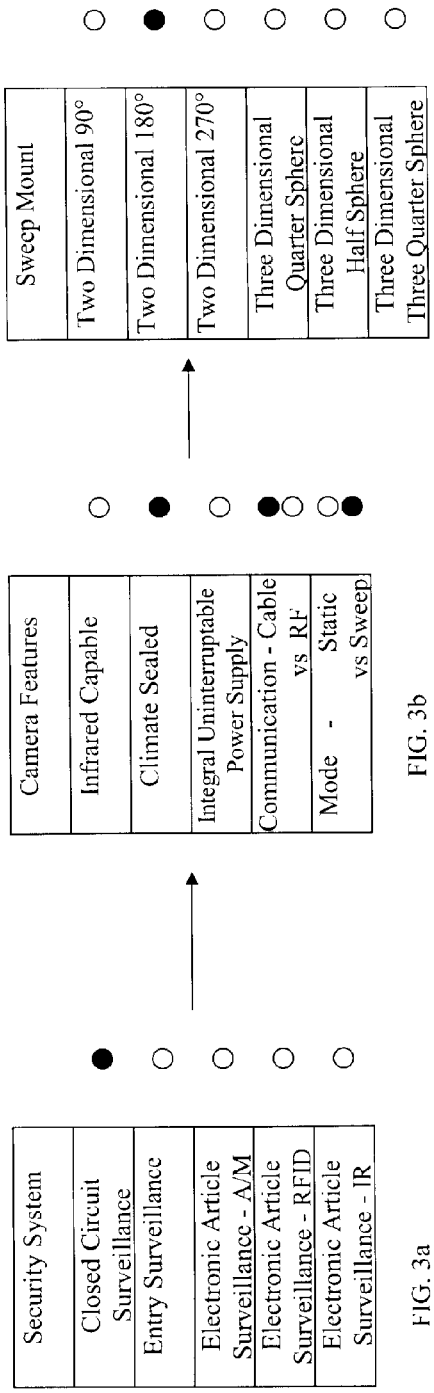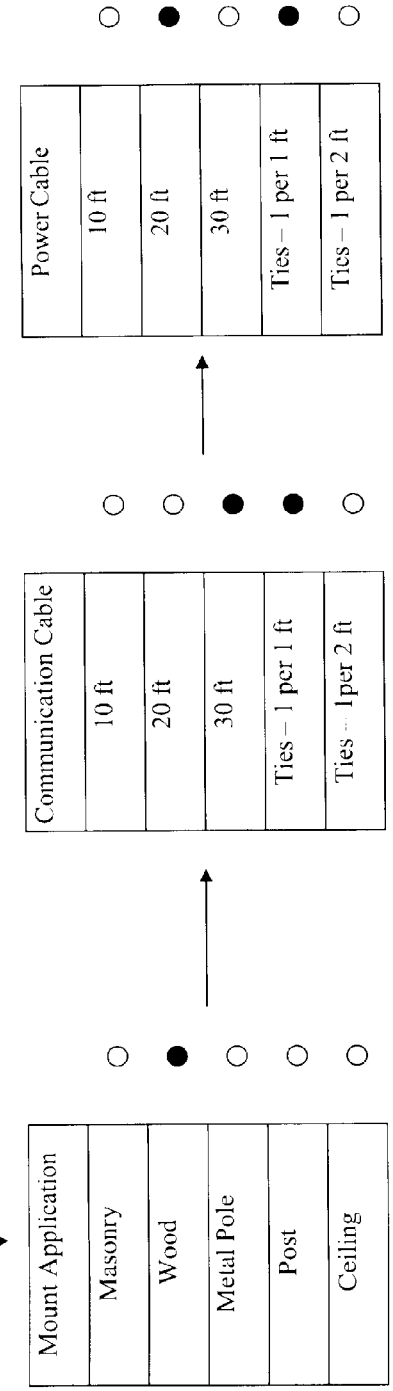
FIG. 3

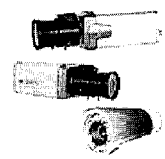
ID: 001026000
Cameras
Our camera line offers a very complete portfolio of alternatives for all needs and applications. We have drafted solutions that allow our customers to configure systems based on their exact needs.

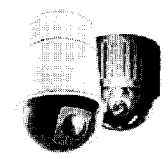
ID: 001026001
Pan/Tilt/Zoom Cameras
When a fixed view is not enough, the advanced features of the newest integrated pan/tilt zoom cameras will do the job. High speed action, intelligence, ultra magnification and low light performance, all at a great value.

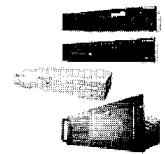
ID: 001026002
Video Recorders

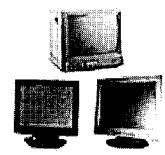
ID: 001026003
Monitors
Monitors are a very important part of a CCTV system. We offer state of the art, flat screen surveillance and public view style monitors for all budgets.

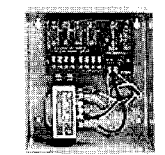
ID: 001026005
Power

FIG. 7

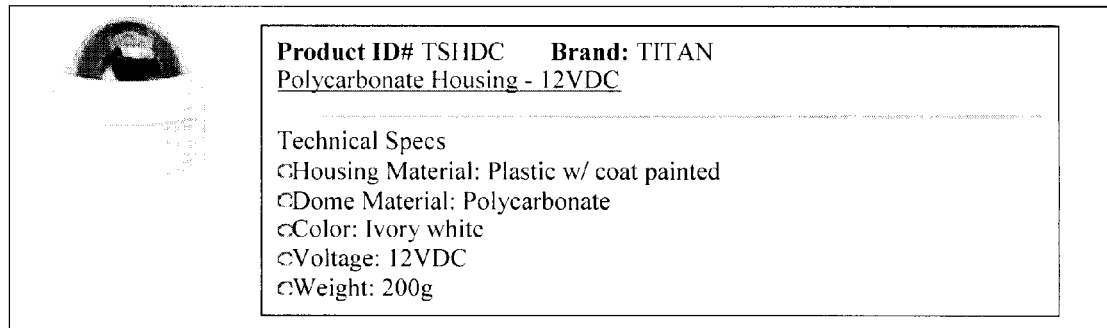

Product ID# TSHDC  Brand: TITAN
Polycarbonate Housing - 12VDC

Technical Specs
○Housing Material: Plastic w/ coat painted
○Dome Material: Polycarbonate
○Color: Ivory white
○Voltage: 12VDC
○Weight: 200g

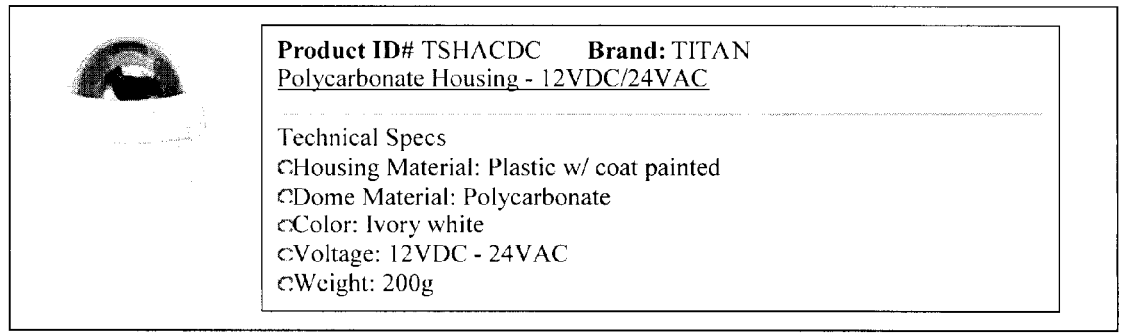

Product ID# TSHACDC  Brand: TITAN
Polycarbonate Housing - 12VDC/24VAC

Technical Specs
○Housing Material: Plastic w/ coat painted
○Dome Material: Polycarbonate
○Color: Ivory white
○Voltage: 12VDC - 24VAC
○Weight: 200g

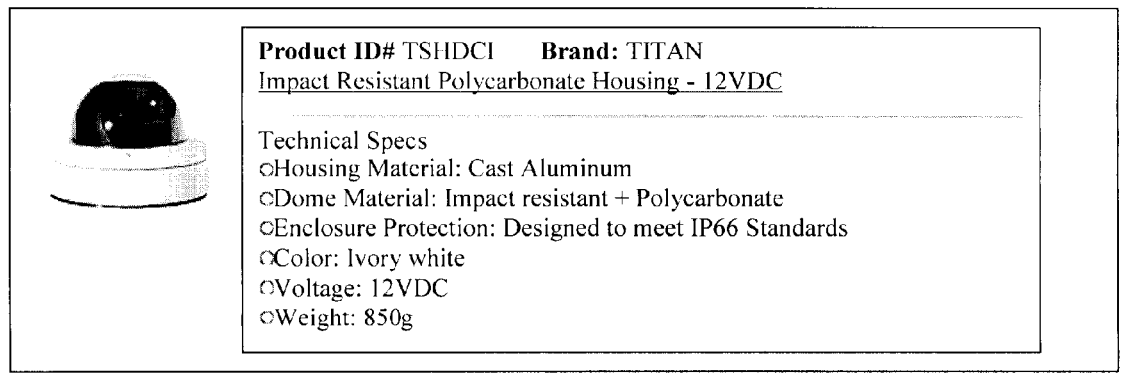

Product ID# TSHDCI  Brand: TITAN
Impact Resistant Polycarbonate Housing - 12VDC Technical Specs
○Housing Material: Cast Aluminum
○Dome Material: Impact resistant + Polycarbonate
○Enclosure Protection: Designed to meet IP66 Standards
○Color: Ivory white
○Voltage: 12VDC
○Weight: 850g

FIG. 9

ADVANCED SALES SYSTEM

This application claims priority to U.S. Provisional Application 61/164,992, filed on Mar. 31, 2009. The entire disclosure contained in U.S. Provisional Application 61/164,992, including the attachments thereto, is incorporated herein by reference.

BACKGROUND OF THE INVENTION

Many markets and product areas require a significant level of expertise in the products and services being sold and purchased and also have an extremely large number of interrelated parts, accessories, and services for the products. Also, some fields, in particular technology fields, can have frequent advances and updates in possible product offerings. This creates a substantial challenge for sales oriented businesses that need to have sales persons trained and informed in large and complex product and service offerings.

In addition to the need to train and inform the sales force, the complex and large product offering produces substantial challenges with respect to the shipping and supply of the products once they are sold. Many products also require installation of the product and training of the customer once the product is delivered and installed. These additional functions, while very important for return customers and general reputation in a market, are somewhat divorced from the sales function of a company. This separation of functions may lead to a break down of quality service in the delivery and installation of the product and training of the end-use customer.

SUMMARY OF THE INVENTION

The several embodiments of the present invention are global communications network oriented advanced sales systems. This global communications network may include the Internet. A first entity sets-up and maintains the advanced sales system and provides a second entity access to the advanced sales system over the global communications network. The second entity can be a sales oriented company, including a company comprised of a single person. The embodiments provide a high degree of pre-prepared information for sales personnel that can be integrated with the information of the company that the sales personnel are working for as well as extensive training information for the sales personal and the interrelationship of the various products being sold. The products being sold may be proprietary to a company using the advanced sales system, the products may be provided by, and or proprietary to, the company supplying the advanced sales system to the sales oriented company, the products may be those of third part original equipment manufacturers (OEMs) and proprietary to the OEMs, or the products being sold may be a combination of product proprietary to the company utilizing the advanced sales system, product supplied by the company supplying the advanced sales system, and OEM products.

The embodiments of the present invention provide a system for sales personnel to generate sales proposals based on information within a database and the selections and information provided by the sales personnel to the system. The company information for which the sales personnel work, such as trademarks, logos, company slogans, and other text relating to the company, can be provided to the system and automatically interwoven with the product information generated by the sales personnel's input and combined into an integrated sales proposal. The sales proposal has information about the selling company along with the product and service information.

The database of the system provides extensive information resources. This information includes, products specifications sheets, operation and installation manuals, brochures, installation solutions, forms, including business forms, and training material such as tutorials. The product related information includes the function, specification, and requirements of the various products being offered as well as relational information such as which products work with other products, what accessories a given product requires, and what components can have substitutions. The product information provides the sales personnel the ability to select products based on the particular needs or requests of a customer. The business form resources include return authorization forms and other forms likely to be needed in the course of operating a business.

In addition to the product information listed above, the database provides a relational structure for the various interrelating components of the products being sold. For example, a sales person might select a given product component based upon the needs and requests of a customer. The a advanced sales system will then provide options relating to that component, such as brackets and screws, power supplies, protective covers, software modules, etc. Based on the particular applications of the products eventually selected, the sales person selects options through the relationship structure to fully specify a sales proposal for a customer. Through the use of a database and the defined operational relationships, a sales person can not only select the major components needed by a customer, but can also be assured of correctly selecting all necessary supporting accessories for a particular application and customer. When a major product component is selected, the advanced sales system provides prompts for selecting accessory product components associated with the major product component. Additionally, applicable substitution components are provided, so that a sales person can fine tune a project proposal by switching in components for cost or technical reasons.

Of course, in any sales transaction the price is a key factor. The database and software generating the proposals based upon the sales person's selections provides price and cost information in the sale proposals. This price information can be restricted to the retail price that will be presented to the customer. This provides a level of confidentiality for the markup of products being sold since the sales person will not have access to that. Markups and margins in sales transactions are highly proprietary to companies and the ability to limit the dissemination of the information is highly valued for the ongoing competitive edge of a company.

Also critical to the competitive edge of a company, is the ability to oversee, track, and supervise the sales force of a company. The embodiments of the advanced sales system of the present invention provide ample means for a sales manager to monitor and supervise the sales personnel. Sales proposals generated by the sales personnel are saved in the advanced sales system along with the information about the particular customer for which the proposals are intended. This allows a sales manager to know what customers the sales force are interacting with and the status of various proposals and possible sales. The capture of the sales proposals on the advanced sales system lessens the proprietary relationship between a particular sales person and a particular customer. Should a sales person decide to leave a company that is using the advanced sales system, sales managers can easily inform themselves of any pending proposals created by that sales person and act to follow up with the customer. Sometimes sales persons will attempt to take a customer with them to a new company. The ability of a sales manager to know the outstanding projects of a sales person and the customer allows the sales manager to work to retain the customer in a seamless fashion.

In addition to the ability to review sales proposals and their status, various embodiments of the system provide various reports to assist a sales manager with metrics for measuring and comparing sales activity by sales team members. The reports may cover topics such as activity, performance, and forecasting. The activity report would provide activity information by sales agent and category. There are several possible approaches for measuring performance and respective reports for doing so, including such as: Proposal Status Detail by Agent and Category; Proposal Status Summary by Agent and Category; Agent Monthly Productivity Summary; Agent Monthly Productivity Detail; Agent Group Productivity Summary; Expense Summary by Agent; and, New Accounts by Agent & Category. For forecasting, some embodiments of the system provide a Sales Forecast by agent and Category Report.

After a sales proposal is accepted by a customer, it is then necessary to make sure that product is delivered and installed and the customer is properly trained on the uses and maintenance of the product. The embodiments of the advanced sales system provide a project management function to satisfy these needs. The project management function makes sure that product is shipped to the customer. The particular product may be product proprietary to the company using the advanced sales system, product proprietary to the company providing the use of the advanced sales system, or may even be product proprietary to third party. Regardless of the source of the product, the advanced sales system makes sure that product is shipped either from the sales company if it's proprietary to that company, from the warehouse of the advanced sales system company if the product is that of the advanced sales system company, or by ordering the product from third party vendors, suppliers, or original equipment manufacturers.

Once the product is delivered, there is frequently a need for follow up, such as installation of the product and training of the customer. The project manager function supplies the means for hiring installation personnel which may be totally separate and apart from the company that has sold the product. The project manager function oversees the installation personnel selected. In addition the project manager function provides personnel for the training of the customer. The training personnel may or may not overlap with the installation personnel. Of course, the project manager function provides follow up to the end user customer to complete the sale.

The separation of the delivery and installation of a product and the customer training from the sales company and sales function, greatly reduces inventory and logistics problems for the sales oriented second entity. In a market segment where the product being sold has an extremely large amount of customization resulting in a concomitant large number of accessories, the ability to avoid warehousing a large inventory is a major financial advantage.

BRIEF DESCRIPTION OF THE DRAWINGS

FIG. 3 shows an embodiment of the product selection module presented by the part of he advanced sales system located on the secure server.

FIGS. 7, 8, and 9 show a progression of screens in a product selection module.

DETAILED DESCRIPTION OF EMBODIMENTS OF THE INVENTION

Figure 1:
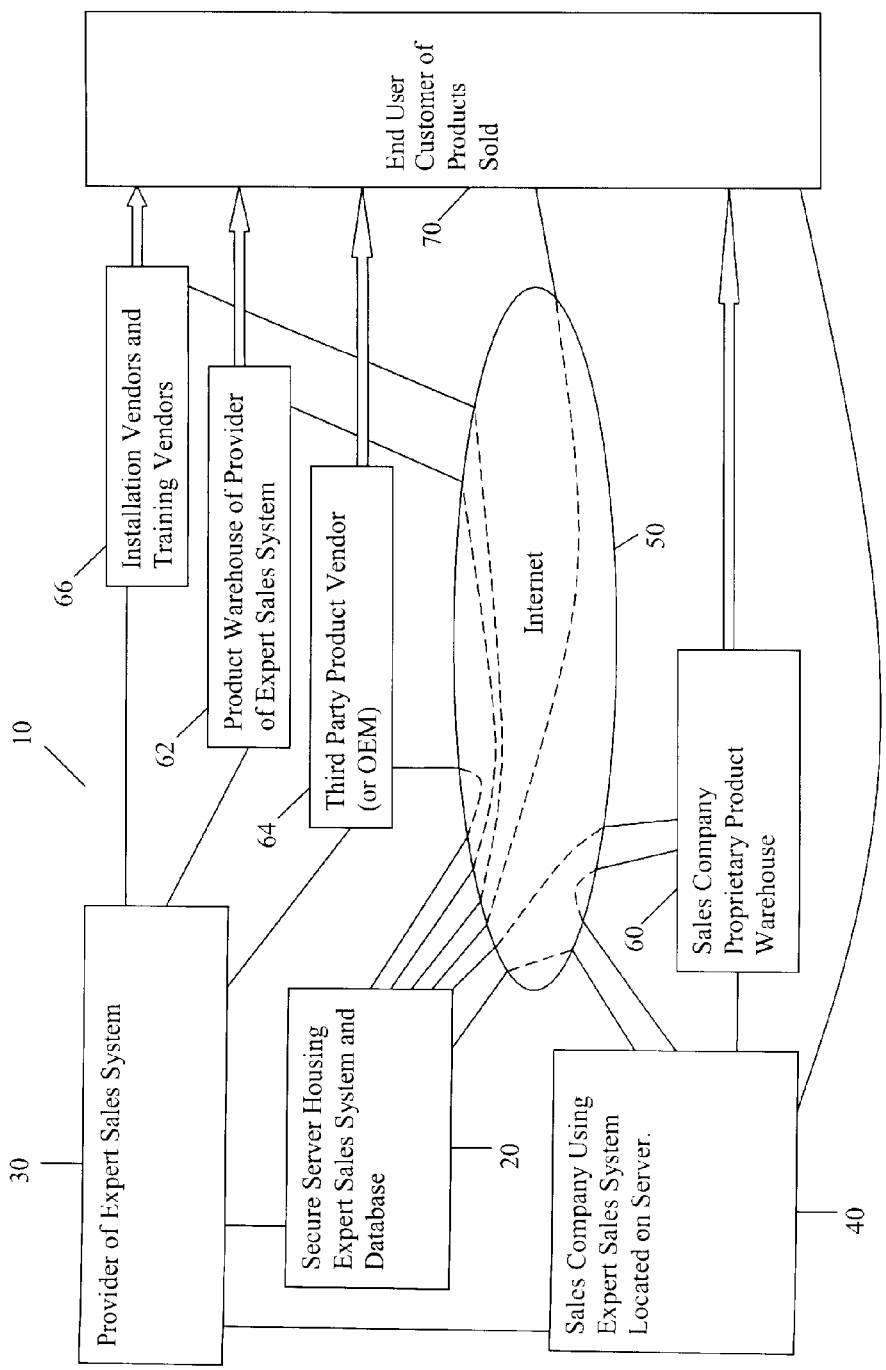
FIG. 1 is a block diagram showing the relationship of the components of the advanced sales system.

FIG. 1 shows an embodiment of the advanced sales system 10. A secure server 20 houses the software, database, and some communications aspects of the advanced sales system 10. A first entity, the provider 30 of the advanced sales system 10, sets up and administers the software, database and communications elements on the secure server 20 and generally maintains and updates the advanced sales system 10 and database as needed. Provider 30 licenses access to advanced sales system 10 to a second entity, sales company 40, under any of various licensing arrangements. Multiple secure servers 20 may be housed within a single machine, i.e. computer center, with each secure server being proprietary and dedicated to a particular sales company 40. Sales company 40 can access its secure server 20 via global communications network 50 and when necessary sales company 40 can interact and communicate with the advanced sales system provider 30 directly as a client.

Figure 2:
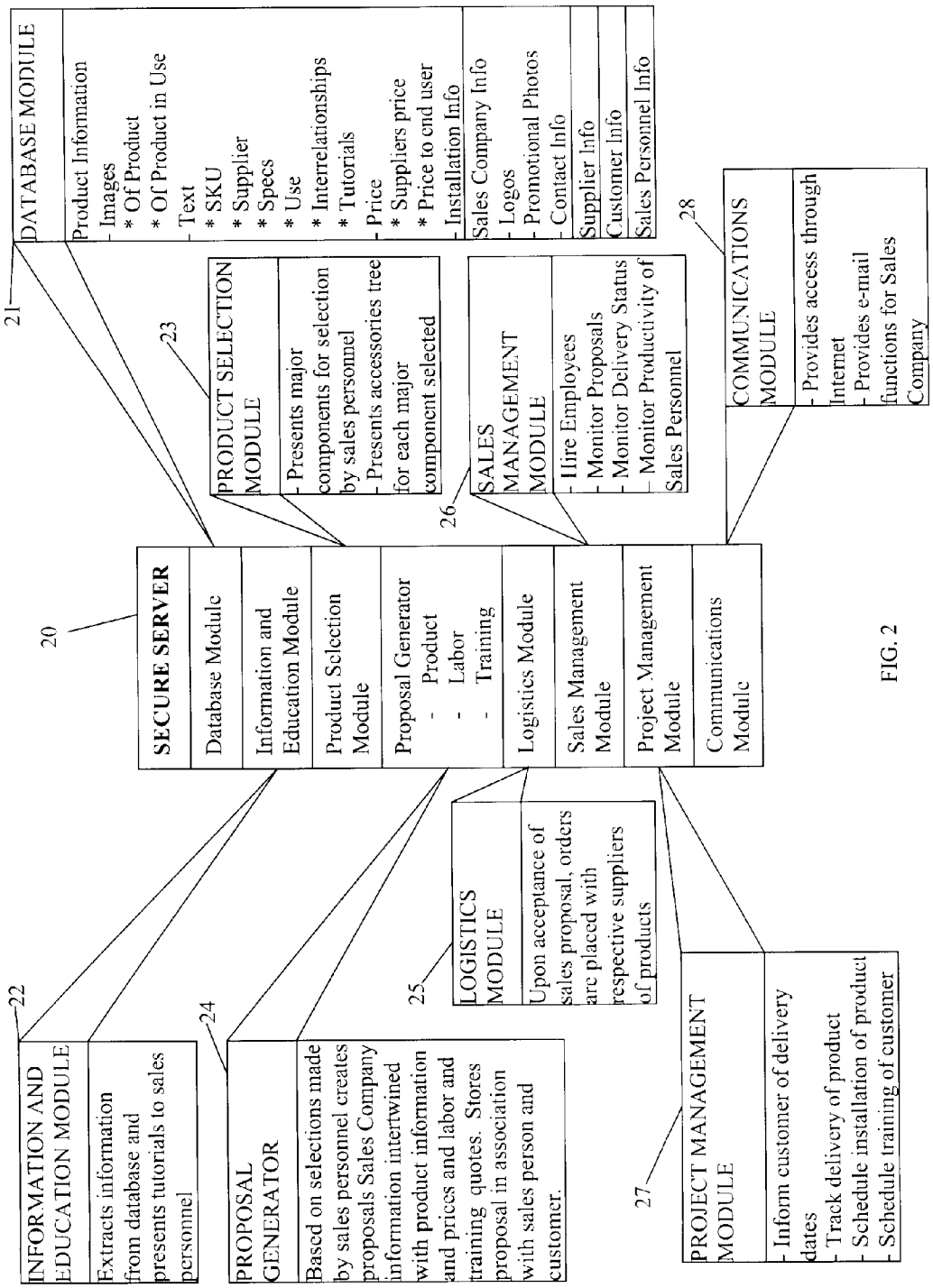
FIG. 2 is a block diagram of the various modules present on the secured server and the functions provided by each.

FIG. 2 shows an embodiment of secure server 20 with the various software modules and functions shown in detail. One such module is the database 21 that contains the information stored on the server. Types of information stored on database 21 include product information, sales company information, supplier information, customer information, and sales personnel information. Database 21 is structured to also store the relationship of various pieces of information and to allow other software modules to manipulate the information in database 21.

Product information stored in database 21 can relate to several aspects of the product being sold. These include images both of the product and of the product in use, text detailing such information as SKU numbers, supplier, specifications, uses of the product, interrelationships of various product articles, more detailed tutorials on how the product should be used, information on installation of product, and finally price, both the supplier's price and the price charged to an end user. Along with information about the products being sold, the database may store information about the sales company such as its logos, promotional photos and contact information. The products not produced directly by the sales company or the advanced sales system provider 30 will be associated with other suppliers and the information relating to these suppliers can also be retrievably stored in the database. Of course, pertinent information about customers will also be stored in the database. Finally, to track various proposals and the effectiveness of sales personnel, the database would have information about personnel and their projects.

In more complex areas of commerce, it may be necessary to provide tutorials to the sales personnel. This is also necessary in fields with frequently improved and updated products such as technology fields. The information and education module 22 provides a means for sales personnel to extract information from database 21 and read tutorials on products, their interrelationships, and their uses, operation, and installation.

Once a sales person is thoroughly familiar with the products, that person can effectively pursue customers. After the sales person contacts a prospective customer and gains an understanding of their needs and desires, a well trained sales person can begin to select products for the customer's needs. The product selection module 23 presents the major product components and related groups. When a sales person selects a particular product item, the product selection module 23 prompts the sales person to select accessory products for that particular major product item. In one embodiment, a decision tree progressively presents additional accessories until a major product component is fully kitted out with accessories. The decision tree need not be a single track path, since many accessory choices will not be mutually exclusive. By way of example, if the field of commerce is security systems, and the major product item selected is a closed circuit television camera, then the accessories tree will present options for selecting brackets for mounting the camera, lens filters for the expected conditions, cables for powering the camera and for retrieving data, and possible uninterruptable power supplies along with other accessories. Through the use of the accessories tree, product selection module 23 allows a sales person to compose a thorough and complete list of accessories for each given major product selected. This allows a detailed and accurate product list for generating a sales proposal.

Based on the selections made by the sales personnel, proposal generator 24 compiles information from database 21 and creates a finished sales proposal in a format suitable for presentation to the client. The electronic file format of the sales proposals may be any currently popular electronic file format such as portable document format, i.e. pdf, as the electronic file format is only an expediency. Proposal generator 24 uses the sales company info such as the logo, promotional photos, and the contact information for the sales company and intersperses that information appropriately with the product information. The proposal created by proposal generator 24 addresses products and their costs, labor for installation of the product, and suggested training for the personnel of the end using customer. Information regarding the product, labor and training are all accessible to the proposal generator 24 in the database module 21. Once a proposal is generated, it is stored as a pdf document, or other electronic format, and associated with both the customer and the sales personnel who generated the proposal.

Once a proposal is accepted by a customer, a logistics module 25 begins the process of acting upon the proposal. The logistics module can generate orders with appropriate suppliers and coordinate delivery of the product. Referring to FIG. 1, it can be seen that secure server 20 is capable of communicating with and through global communications network 50. Lines running from secure server 20 to other components of the system indicate communication connections. The portions of the communications routed over global communications network 50 are indicated by dashed lines. Logistics module 25 of advanced sales system 10 can contact various suppliers to initiate the shipment of product. The logistics module 25 of secure server 20 can, for example, communicate with the sales company's own product warehouse 60 to initiate product shipment. The logistics module 25 can also communicate with the product warehouse of advanced sales system provider 62. Additionally, the logistics module 25 can place orders with $3^{rd}$ party product vendors 64. Having ordered the products for the end user customer 70, logistics module 25 can also contact and schedule installation vendors and training vendors 66 for end user customer 70.

Returning to FIG. 2, a sales management module 26 provides several tools for a sales manager. Sales management module 26 allows a sales manager to hire employees, monitor proposals, monitor delivery status of products purchased in association with a proposal, and to monitor the productivity of sales personnel and compare that productivity. These functions are enabled by the information stored in database 21 and are important for the success of a sales company 40.

Once a proposal is accepted and orders placed by logistics module 25, a project management module 27 facilitates follow up. Follow up may include the monitoring of product shipments, and scheduling the installation of the products and training of customer personnel. This module allows the successful completion of the transaction and is tied in to the other modules, in particular database 21.

Communications module 28 provides an interface between secure server 20 and the outside world in general. Communications module 28 includes e-mail functions for sales company 40. Communications module 28 also provides direct access by advanced sales system provider 30, so that the substantial quantity of information in database 21 can be entered.

FIG. 3 shows an example of a product selection tree that allows a sales person to provide a detailed proposal. The area of commerce used in this example is that of security systems for retail stores and other applications. In the upper left corner of FIG. 3, FIG. 3a shows an initial selection menu for which type of security system is to be used at this step. Among the options are: closed circuit surveillance; entry surveillance; electronic article surveillance—A/M; electronic article surveillance—RFID; and, electronic article surveillance—IR. The closed circuit surveillance system would comprise closed circuit television cameras, etc. The entry surveillance system would comprise switches and sensors at doors and windows of an area desired to be protected. The electronic article surveillance—A/M system would place acousto-magnetic tags on articles and monitor exits for the unauthorized removal of the article. The electronic article surveillance—RFID system would place radio frequency identification tags on articles and monitor the exits for unauthorized removal of the articles. The electronic article surveillance—IR system would use infra-red tags placed on the articles and monitor exits for the unauthorized removal of the articles.

In this example at FIG. 3a the closed circuit surveillance is selected and FIG. 3b shows a possible display by the advanced sales system 10 in response to the selection. FIG. 3b shows the possible features for cameras used in a closed circuit surveillance system. Among the options are infra-red capable, which means the camera can emphasize light in the infra-red spectrum when necessary. Another option for the camera may be a climate sealed feature where the camera is sealed to protect it from the elements. This might be advantageous for cameras operating outside or in harsh environments. Another feature might be whether a camera has an integral uninterrupted power supply that would allow the camera to continue to operate if external power is cut. Other features might require a choice between two options, such as the communications feature where a selection is made whether the camera communicates via a cable or via radio frequency. Similarly, a camera may be static and not move, or it may sweep an area. FIG. 3b shows an option to choose between those possibilities.

In the example of 3b the camera is climate sealed, communicates by cable, and has the ability to sweep the area it is monitoring. FIG. 3c of the example in FIG. 3 shows options based upon the selection of a camera that operates in a sweep mode. The first three options indicate a camera that is fixed in its plane but swivels through varying degrees within that plane. The last three options are for a camera that can sweep through a three-dimensional range.

The two-dimensional 180 degree option having been selected, the system may then present options for how the camera will be mounted. This will affect the brackets, screws, and other items used to mount the camera. Various options are presented in FIG. 3d and the option for wood is selected.

After that selection the system presents requirements for communications cables. In FIG. 3e it can be seen that a 30-foot communications cable is selected and the quantity of ties provided with that are selected to be 1 per each foot of cable. Finally, in this example, FIG. 3f shows a selection for a power cable where the cable selected is 20-feet long and the total number of ties to go with it is to coincide with 1 per foot.

By providing the tree menu for selecting accessories, advanced sales system 10 allows a sales person to select the appropriate accessories among what my be a selection of thousands of small and minor parts. This provides a highly customizable proposal for customers. The particular flow shown in FIG. 3 is not required, and some embodiments of advanced sales system 10 may return to a home screen for the major product item being accessorized with the completion of specifying each accessory. A salesperson may repeat the process for each major element selected based upon a clients needs and desires. Once the selection of all the major components and attendant accessories are chosen, the proposal generator can collect the information along with prices, labor installation costs, and training costs into a proposal suitable for presentation to the end use customer and having all appearances of being generated by the sales company with the attendant logos and other promotional materials.

Once the proposal is presented and accepted, other modules in the advanced sales system 10 can utilize the data in the proposal to proceed. This may include the ordering of product and the arrangement for installation and training. Also utilizing the proposal data is the sales management tools of sales management module 26.

While several features of advanced sales system 10 are described as occurring within modules, this should not be taken as an indication that the various modules and functions are necessarily separately distinct. Some modules may actually just be a particular report presenting information and choices from the database 21. For example, the project management module 27 and sales management module 26 may present very similar information.

Figure 4:
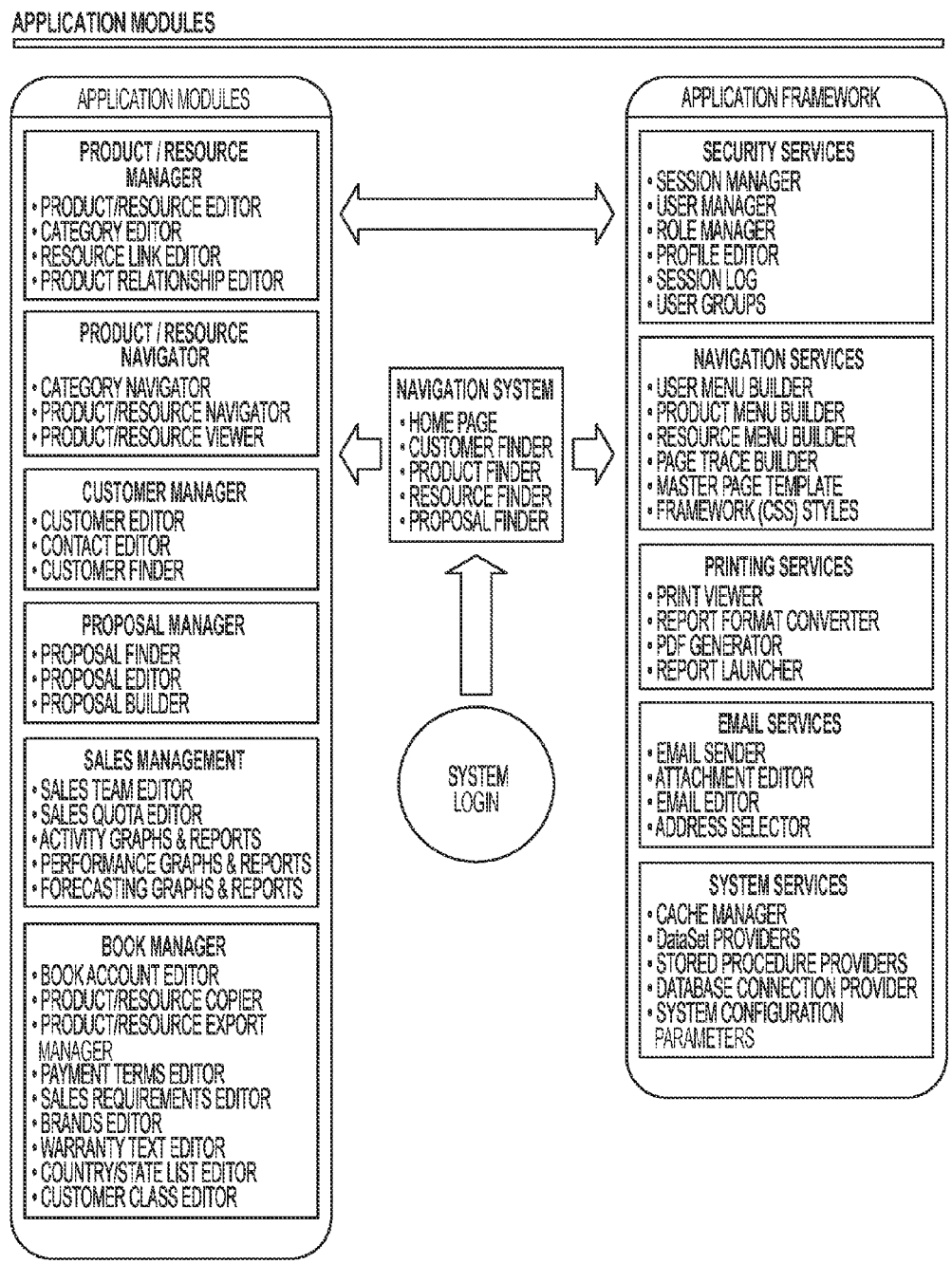
FIG. 4 is a block diagram of another embodiment of the advanced sales system with application modules and application framework.

FIG. 4 is a block diagram of another embodiment of the advanced sales system with application modules and application framework. In this embodiment, the application has a three tier design made up of a thin web browser based front end, an application logic tier at the server side, and a database server tier to store and manage all application data. The web browser based front end provides an interface whereby the sales company uses the web browser to access the application and interact with the application logic, or program, part of the advanced sales system. Necessarily, some small portion of logic or code is transferred to the site where the browser is being used to access the server and application. The database server tier stores information such as text descriptions, graphics, images, relationships, prices, addresses, etc. The information stored in the database may relate to products, the sales company, or to customers, and the information is extracted for display, printing, etc. in response to a sales company user interacting with the application logic via the browser front end. The database tier may be stored on the same server as the application logic tier or the database may be stored on a separate server accessible by the application logic tier, and different classes and types of information will be accessible to different users.

Referring to FIG. 4, various application modules in the application logic are shown. Application modules in the application logic are built on top of an application framework. Among modules that may be contained in various embodiments of the advanced sales system are those shown in FIG. 4 which include: Product/Resource Manager; Product/Resource Navigator; Customer Manager; Proposal Manager; Sales Management, and; Book Manager. At a deeper level in the advanced sales system, are elements making up the application framework upon which the application modules are built and operate. Various embodiments of the advanced sales system will include some or all of the elements shown in FIG. 4, including: security services; navigation services; printing services; e-mail services, and; system services. Operating among the application modules and application framework is a navigation system comprised, in some embodiments of the advanced sales system, of at least the thin web browser based front end that, upon login, allows a user to move among elements of the advanced sales system. The amount of modules and framework elements, as well as data types, that a user can interact with and modify, depends on a user's defined status and capabilities. Some of the functions and screens of the application modules and framework elements may be used to enter data into the catalogs and tables of the database. Some of these functions and screens may be used to retrieve, filter, and sort data. Some of these functions and screens may be used to establish relationships among data. A user's position will determine what functions and screens a user will have access to. For example, a user working for a sales company using the export sales system will have needs, functions, and authority far different from a user working for the company providing the advanced sales system. The information defining what functions and screens to which a user has access is contained in a user's profile for each user.

Some of the functions, and/or interactive screens, that a Product/Resource Manager module might have and display are: Product/Resource Editor; Category Editor; Resource Link Editor, and; Product Relationship Editor. These functions and screens assist a user in entering information into the system database. Also, these functions and screens can be used to establish relationships among the information in the database. Only users that are entitled to change the structure of the database or to change information in the database will have been allowed the use of the functions and screens.

The Product/Resource Editor allows a user to add new products or resources to a catalog in the database. In addition to adding the product or resource, the Product/Resource Editor allows a user to enter the product's image, SKU number or product ID, brand, a short description of the product, and the technical specifications of a product. This information is associated with the product in the database.

The Category Editor allows the user to add new product or resource categories to the catalog. Categories can have several levels of sub-categories before they actually list products or resources. They provide the means to organize the products or resources into a comprehensive category tree. Products and resources are kept on separate trees, and the application provides a separate navigation menu for each.

The Resource Link Editor allows a user to establish hyperlinks to information resources, product pages, reports, or files. Each product or resource category can display several groups of hyperlinks to related resources on the right side of the page. Clicking on the resource link will take the user to that resource, and/or open the corresponding file. Resource links attached to a parent category will display at all underlying sub-categories in the tree. Products and resources themselves can also have resource links attached. The Resource Link Editor allows the user to create these hyperlinks within the catalog.

Product Relationship Editor allows the user to manage relationships between products in the catalog. Each product can have other products attached as Accessories, Similar Items, Replacements, and Installation Solutions. On each of these sections, the catalog manager can also create different subgroups of products. For example, under Accessories, the user can attach multiple products grouped as Backup Devices or Network Interfaces or whichever way he prefers to group accessories for that particular product. Each of the groups can have a legend that gives instructions or rules to the end user of the catalog on how to actually select the corresponding products.

Some of the functions, and/or interactive screens, that a Product/Resource Navigator module might have and display are: Category Navigator; Product/Resource Navigator, and; Product/Resource Viewer. These functions and screens assist a user in navigating among categories, products, and resources, and also viewing information about products and resources. A user that does not have the user rights to alter the basic information contained in the database and the relationship of the information will have access to these functions and screens of the advanced sales system.

The Category Navigator allows the user to browse through the entire product or resource category tree. On each category page, the navigator displays a picture, the category's name, and a short legend explaining the content of the category. The user can click on the image or on the category's name to drill into tree and display all subcategories. The Category Navigator shifts control to the Product Navigator when the user clicks on the category that is directly linked to a list of actual products.

The Product/Resource Navigator allows the user to browse through the entire list of products pertaining to the given category. For each product, the navigator displays an image that resembles the product, the product's SKU number or ID, the product's name, brand, and a short legend explaining what the product is, and the products technical specifications. Price and Cost information are also shown depending on the user's security profile. When the user clicks on the product's image or name, the navigator invokes the product viewer to display the corresponding product's information page. Products on the page are organized on different tabs showing Stock Items, Discontinued Items, and Special Order Items. For each product shown the user can enter the quantity desired and click on the "Add To Cart" button, to have the system add the product to the current proposal the user is working on, or to a new proposal if no proposal is currently open.

The Product/Resource Viewer allows the user to view a product's information page, which displays the product's image, SKU number or product ID, brand, a short description of the product, and the technical specifications. In addition, the viewer shows all related accessories, replacement items, installation solutions and other similar items. For each product shown the user can enter the quantity desired and click on the "Add To Cart " button, to have the system add the product to the current proposal the user is working on, or to a new proposal if no proposal is currently open.

Some of the functions, and/or interactive screens, that a Customer Manager module might have and display are: Customer Editor; Contact Editor; and; Customer Finder. The Customer Information Editor allows the user to create new customers as well as to update all general information stored for a particular customer, such as its name, billing and shipping address, etc. The Contact Editor allows the user to add customer contacts, including their name, position, phone, email and other information. The Customer Finder allows the user to search the customer database to find a customer by entering a few words. The system will look for these words in several places including the customer's number, legal and commercial name, and other fields in the customer's database. These functions and screens assist a user in editing information about customers and entering new customers into the database. The functions and screens will be of particular interest to sales persons as they make additional customer contacts and follow up with active customers. As such, these functions are likely to be available to very low level users of the advanced sales system. However, since this information is highly proprietary to the sales company using the advanced sales system, the users of the company supplying and supporting the advanced sales system will most likely not have access to these functions, screens, and related data.

Some of the functions, and/or interactive screens, that a Proposal Management module might have and display are: Proposal Editor; Proposal Builder; and; Proposal Finder. Similarly to the tools and functions relating to customer information, the proposal tools and functions will be used extensively by sales persons, since they will be developing proposals to present to customers. Therefore these tools, functions, and screens will likely be available to very low level users of the advanced sales system. However, since this information is highly proprietary to the sales company using the advanced sales system, the users of the company supplying and supporting the advanced sales system will most likely not have access to these functions, screens, and related data.

Proposal Editor allows the user to create a new proposal from scratch or to edit an existing proposal. Proposals are automatically numbered by the system and the user can save multiple revisions of the same proposal at will. Each proposal stores all the general information about the customer, the list of products being offered, the payment terms, and the list of requirements to be fulfilled by the customer and the supplier.

Proposal Builder is the process that actually builds the proposal document in a transferable electronic form such as a PDF or JPG file. Multiple options are supported to change the way the final proposal document looks. Options can be given to add cover pages, include product images and technical specs, among others.

Proposal Finder allows the user to quickly locate proposals based on a few words. Proposals can be located by number, customer number or name, or words that appear in various fields within the proposal. From the finder, proposals can be clicked on to open and edit them or they can be sent to the proposal builder to print or email them to a customer.

Some of the functions, and/or interactive screens, that a Sales Management module might have and display are: Sales Team Editor; Sales Quota Editor; Activity Graphs & Reports; Performance Graphs & Reports, and; Forecasting Graphs & Reports. This module provides both the ability to enter data and relationships regarding sales persons and the ability to see and analyze data relating to sales and sales persons. The Sales Team Editor allows the user to create several teams of sales agents and assign a sales manager to each team. Teams allow the manager to monitor the activity and performance of each member and forecast their sales for the coming months. Sales Quota Editor allows the user to create and edit the sales quotas for each member of a team. Both revenue and profit quotas are assigned on a per month and year basis for each sales agent and are used to monitor their performance through various reports and graphs. The tools and functions of this module are very useful to sales managers and therefore will be available to users at a mid-level of the sales company using advanced sales system. Also, as the information available through these functions and tools is highly proprietary to the sales company, users in the company supplying and supporting the advanced sales company will not have access to these tools and information.

With regard to information only available to the sales company using the advanced sales system and information only available to the company providing and supporting the advanced sales system, these two sets of information can be easily maintained in segregation through the maintenance of multiple "books" within the application. A user for the supporting company can set up books for the sales company without having access to the data within the books, and a Book Management module allows for the management of several books within the database, each storing a separate database of products, resources, customers and proposals and users.

Because the Book Management module is fundamental to setting up the advanced sales system, segregating data, and access to data, it has several tools and functions. Depending on the particular embodiment, some of the tools, functions, and/or interactive screens that a Book Management module might have and display are: Book Account Editor; Product Catalog Copy Routines; Payment Terms Editor; Sales Requirements Editor; Brands Editor; Warranty Text Editor; Country/State List Editor, and; Customer Class Editor. The Book Account Editor allows the user to create a new book or edit an existing one. Each book contains several configuration parameters that limit the size of the database, specify the mail server settings to be used for sending emails from the application, and specify the header and footer images to be used in the proposal, among others. The Product Catalog Copy Routines allows a user with administrator privileges to copy products from the main catalog to other books. The Payment Terms Editor allows a user with administrator privileges to customize the list of available payment terms that can be used in the proposals for the current book. The Sales Requirements Editor allows a user with administrator privileges to customize the list of customer and supplier requirements that can be included in proposals for the current book. The Brands Editor allows a user with administrative privileges to customize the list of brands that can be assigned to products in the catalog. The Warranty Text Editor allows a user with administrative privileges to customize the Warranty Text that is optionally included in proposals. The Country/State List Editor allows a user with administrative privileges to customize the list of countries and the corresponding states that can be assigned as part of a customer's address. The Customer Class Editor allows a user with administrative privileges to customize the list of Customer Classes that can be used to classify each customer.

While application modules allow a user to interact with the advanced sales system by navigating through the system and entering and viewing data, the framework modules define how that is done. The framework modules also allow interaction with external systems. Among the framework modules that may be available in various embodiments are: Security Services Module; Navigation Services Module; Printing Services Module; Email Services Module, and; Systems Services Module.

The Security Services Module controls access to the advanced sales system and allows the definition of operations that are allowable for certain types of users. Among the tools, functions, and interactive screens that may be present in a Security Services Module are: Session Manager; User Manager; Role Manager; Profile Editor; Session Log, and; User Groups. The Session Manager validates user login information and uses forms authentication and cookies to instantiate new client sessions. It also controls session expiration and prompts a user to reconnect in case the session has expired. Login information is stored in encrypted form within the database. Once authenticated, the user's security profile is loaded and navigation is shifted to the user's home page. In addition, the system controls password expiration and account expiration, prompting users to change passwords periodically. The User Manager allows a user with administrator privileges to create new user accounts or edit an existing one. Passwords can also be reset. The Role Manager allows a user with administrator privileges to create several user roles. Each role gathers a security profile that determines what the user can and cannot do while using the application. The Profile Editor allows for the configuration of a security profile. The Session Log contains an entry for each session accepted or rejected. The User Groups allows a user with administrator privileges to customize the list of possible user groups. Each user can be associated with a single group.

The Navigation Services Module contains menu builders and templates that determine the appearance of screens presented as a user moves through the advanced sales system. Functions contained in the Navigation Services Module include: User Menu Builder; Product Menu Builder; Resource Menu Builder; Page Trace Builder; Master Page Template, and; Framework CSS Styles. The User Menu Builder generates the user menu shown in the navigation system based on the session user's security profile. The Product Menu Builder generates the product menu shown in the navigation system based on the current catalog. This menu is stored in cache for faster performance. The Resource Menu Builder generates the resource menu shown in the navigation system based on the current catalog. This menu is stored in cache for faster performance. The Page Trace Builder generates the line of hyperlinks that show where the user is in the navigation tree. This trace is always displayed by the navigation system. The navigation system applies the master page template to provide style and order to the system. The master page template creates and segments the page into different content areas that can be replaced by actual content belonging to pages in each module. The master page and content pages use the styles defined in a framework.css file to give a consistent overall appearance to the application.

The Printing Services Module handles the report compilation and printing functions and includes the following: Print Viewer; Report Format Converter; PDF Generator, and; Report Launcher. The Print Viewer provides the ability to stream the results to the client browser. The Report Format Converter provides a mechanism to generate a report file in a particular format. The PDF Generator provides the means to generate a report or file in PDF format. The Report Launcher provides a mechanism to centralize the launching of reports and file generators.

The Email Services Module provides an e-mail utility dedicated to the sales company using the advanced sales system, just as any company might have an e-mail service. Among the components of an Email Services Module there may be an E-mail Sender, an Attachment Editor, an E-mail Editor, and an Address Selector. The E-mail Sender provides a centralized mechanism for building an email message and sending that email to all destination addresses. The email configuration settings within the book are used to process and send the email. The Attachment Editor provides a visual mechanism to attach several files to an email, including generating a proposal on the fly and attaching it to the email. The E-mail Editor provides a visual mechanism to create a new email. The Address Selector provides a visual mechanism to select multiples destination addresses from the customer's database and adding those addresses to the email form.

In addition to the framework modules and the application modules, the application logic tier has a Navigation System. The Navigation System is the mechanism that integrates the building of the user interface using the Master Page Template, the dynamically generated user menu, the page trace line, and the Security Profile of the current user's session, and allows the user to navigate from page to page within the application, or deny access to certain areas. The Navigation System adheres to the rules and settings and the links and categories established by a user using the framework modules and the application modules respectively.

Figure 5:
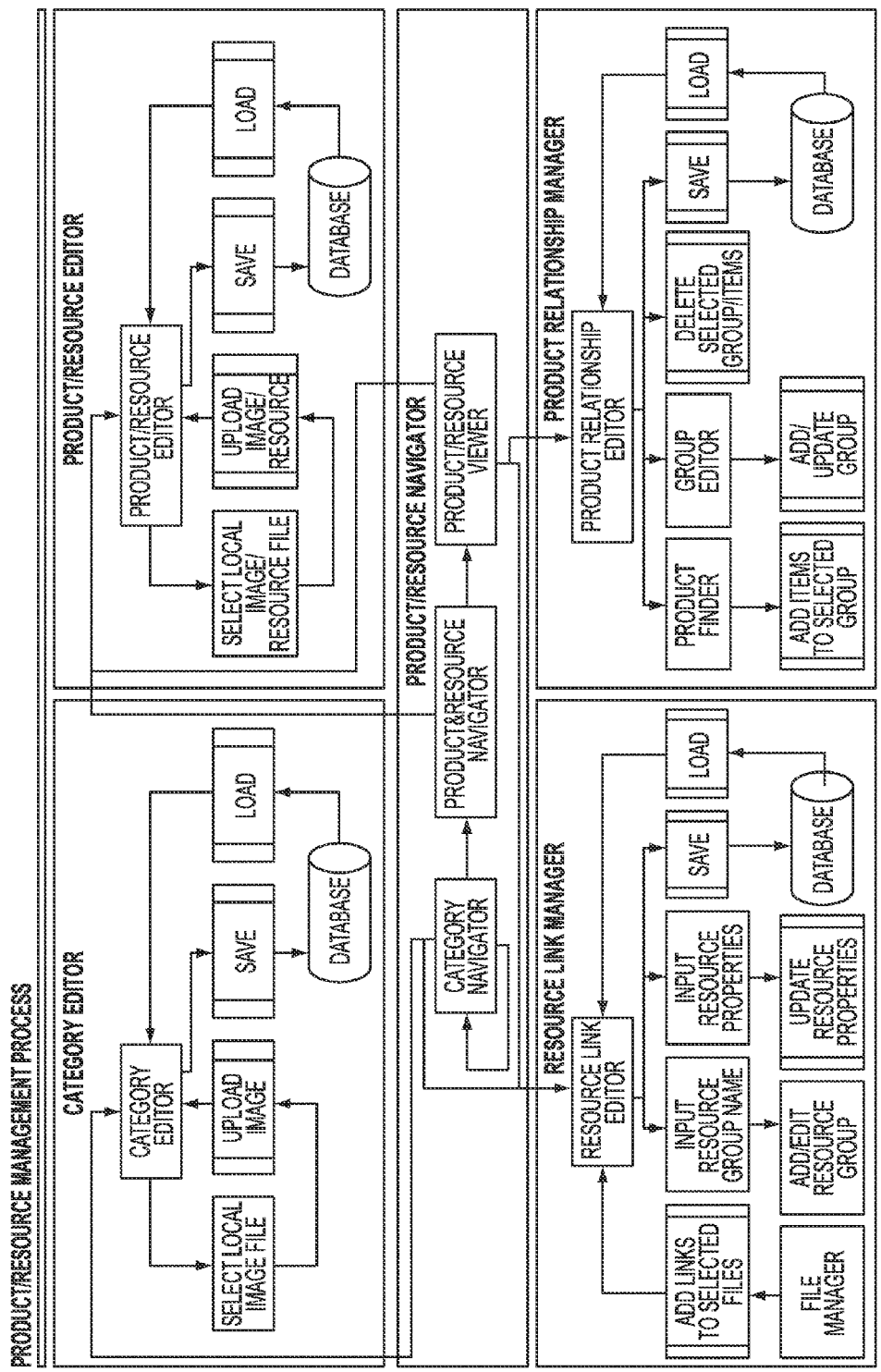
FIG. 5 is a block diagram of product/resource management processes in one embodiment of the advanced sales system.

FIG. 5 is a block diagram of product/resource management processes in one embodiment of the advanced sales system. As may be seen in the block diagram, each of the four functions in the product/resource management module interacts with the database, adding information and creating relationships between information. The navigators in the product/resource navigator module follow the links, relationships, and categories established by the product/resource management module as a user moves through the advanced sales system for various purposes, for example to enter information to develop a sales proposal.

Figure 6:
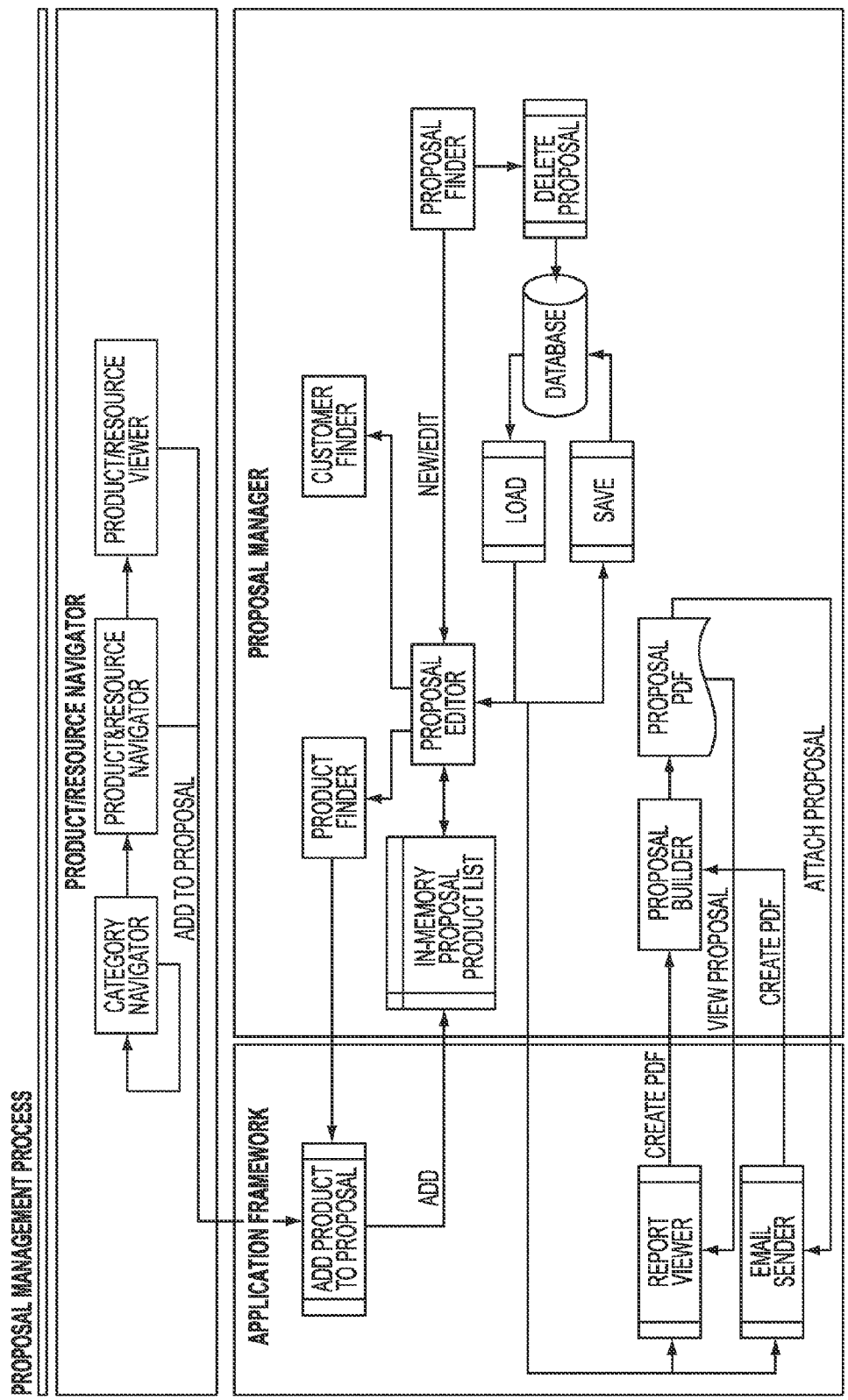
FIG. 6 is a block diagram of proposal management processes in one embodiment of the advanced sales system.

FIG. 6 is a block diagram of proposal management processes in one embodiment of the advanced sales system. The proposal management module can utilize information entered from the customer management module by selecting a customer and associating the proposal being developed with that customer. The proposal management module can present product selection trees to assist a sales person in adding product to a proposal or a sales person can use the proposal management module to develop a proposal without the use of a product selection tree. FIG. 6 also shows application modules operate through framework modules to retrieve information and make information available to e-mail utilities to distribute information from the system.

Figure 8:
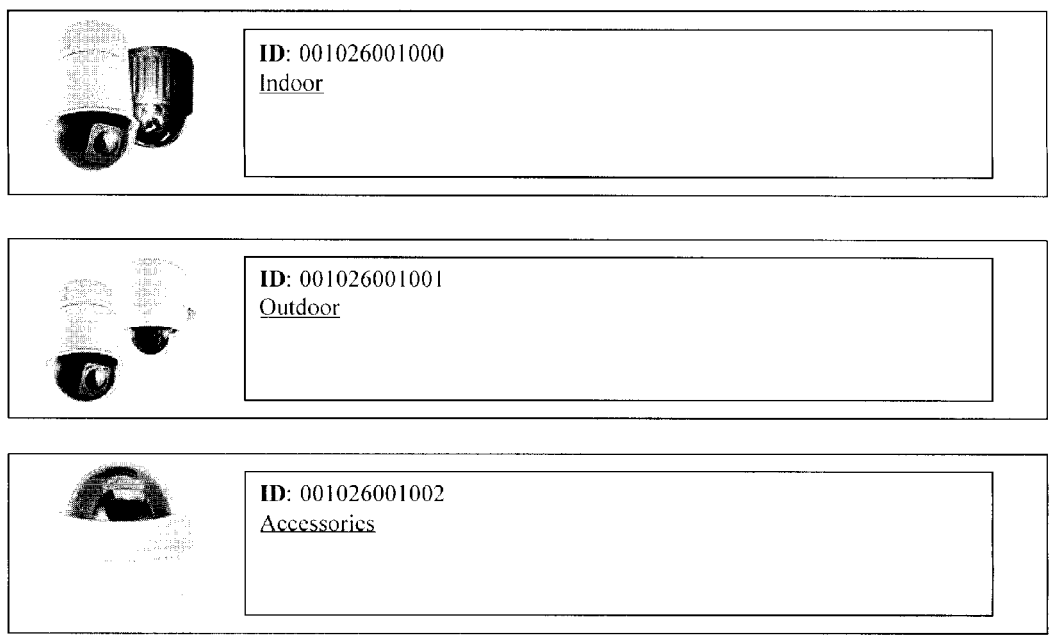

FIGS. 7, 8, and 9 show a progression of screens in a product selection tree. FIG. 7 displays a set of icons representing various choices for closed circuit television surveillance. Several choices may have already been made to get to the screen shown in FIG. 7. For example, the general product area of closed circuit surveillance may have already been selected, followed by a selection of one brand of closed circuit products among several. What is selected from the icons shown in FIG. 7 will determine what is displayed next. In this example, the Pan/Tilt/Zoom Camera product line second from the top is selected. FIG. 8 displays the next set of choices available based upon that selection. If the accessories icon shown in FIG. 8 is selected, then the display shown in FIG. 9 is the result. These screens and the items shown on them are exemplary only and should not be taken as specifically required for the operation of the advanced sales system.

The embodiments discussed herein are not intended to be an exhaustive listing of the possible embodiments of the present invention. They are intended to be illustrative of the present invention and several of the possible embodiments of the invention. The embodiments discussed should therefore not be regarded as limiting the scope of the invention.

Also, when the computer-executable instructions of the advanced sales system are stored, the invention is not limited to storage on a particular type of medium. It may be stored on virtually any kind of computer memory. Such computer memory may include floppy disks, conventional hard disks, CD-ROM, Flash ROMS, non-volatile ROM, RAM, and CD-RW.

We claim:

1. A method of transacting business over a global communications network comprising:
   a first entity maintaining at least one server;
   said first entity providing access to said server to a second entity via said global communications network, said second entity being a sales oriented entity engaged in the sale of a collection of products;
   wherein said collection of products can comprise products proprietary to said first entity, products proprietary to said second entity, and products proprietary to third parties;
   said first entity maintaining on said server a database comprising several categories of information including information about said products, information about the vendors of said products, and information about said second entity;
   said first entity maintaining on said server a product selection module, said product selection module having access to said database and accepting input from said second entity in selecting products;
   said first entity maintaining on said server a proposal generator, said proposal generator interacting with said product selection module, having access to said database, and accepting input from said second entity, said proposal generator creating a sales proposal listing the selected products and information about said selected products, and said second entity's information;
   said second entity presenting said sales proposal to a customer.

2. The method of doing business of claim 1, further comprising:
   said product selection module having decision trees linking operationally related products, said decision trees prompting said second entity to select appropriately grouped products for a proposal.

3. The method of doing business of claim 1, further comprising:
   said first entity maintaining a logistics module on said server, said logistics module initiating orders with said vendors when the status of said sales proposal is entered as accepted.

4. The method of doing business of claim 3, further comprising:
   said first entity maintaining a project management module on said server, said project management module scheduling installation of said products and training of said customer.

5. The method of doing business of claim 1, further comprising:
   said first entity maintaining a sales management module on said server, said sales management module monitoring proposals, sales persons associated with said proposals, and productivity of said sales persons, and said sales management module facilitating hiring of new sales persons.

6. The method of doing business of claim 1, wherein:
   said information may be in the form of text or images.

7. A method of transacting business over a global communications network comprising:
   the maintaining of a server by a first party;
   the providing of access to said server by said first party to a second party engaged in the sale of a collection of products, wherein said collection of products can comprise products proprietary to said first party, products proprietary to said second party, and product proprietary to a third party;

the maintaining of said server by said first party comprising maintaining a database comprising several categories of information including information about said products, information about the vendors of said products, and information about said second party;

the maintaining of said server by said first party comprising maintaining a product selection module, said product selection module having access to said database and accepting input from said second party in selecting products;

the maintaining of said server by said first party comprising maintaining a proposal generator, said proposal generator interacting with said product selection module, having access to said database, and accepting input from said second party, said proposal generator creating a sales proposal listing the products selected by said second party and information about said selected products, and said second party's information;

the inputting of information by said second party into said product selection module and said proposal generator;

the creating of a sales proposal by said proposal generator, said sales proposal listing the products selected by said second party and information about said selected products, and said second party's information;

the presenting of said sales proposal by said second party to a customer.

* * * * *